United States Patent [19]
Sabon

[11] 4,166,928
[45] Sep. 4, 1979

[54] LOOP, DIAL PULSE AND RING TRIP DETECTION CIRCUIT

[75] Inventor: Robert J. Sabon, Chicago, Ill.

[73] Assignee: GTE Automatic Electric Laboratories Incorporated, Northlake, Ill.

[21] Appl. No.: 865,761

[22] Filed: Dec. 29, 1977

[51] Int. Cl.² .......................... H04B 3/46; H04M 3/02
[52] U.S. Cl. ........................... 179/18 FA; 179/18 HB; 179/84 A
[58] Field of Search ........... 179/18 F, 18 FA, 18 HB, 179/84 R, 84 A, 81 R

[56] References Cited
U.S. PATENT DOCUMENTS

| | | |
|---|---|---|
| 4,099,032 | 7/1978 | Roge et al. .................. 179/18 HB |
| 4,104,488 | 8/1978 | Weir et al. ................... 179/18 FA |

*Primary Examiner*—Thomas A. Robinson
*Attorney, Agent, or Firm*—Robert J. Black; Gregory G. Hendricks

[57] ABSTRACT

A circuit which detects the presence and absence of a telephone subscriber loop, before and after ringing current is applied to the loop. Coils functioning as magnetic field generating devices and a Hall effect device are used to perform the detection function.

7 Claims, 1 Drawing Figure

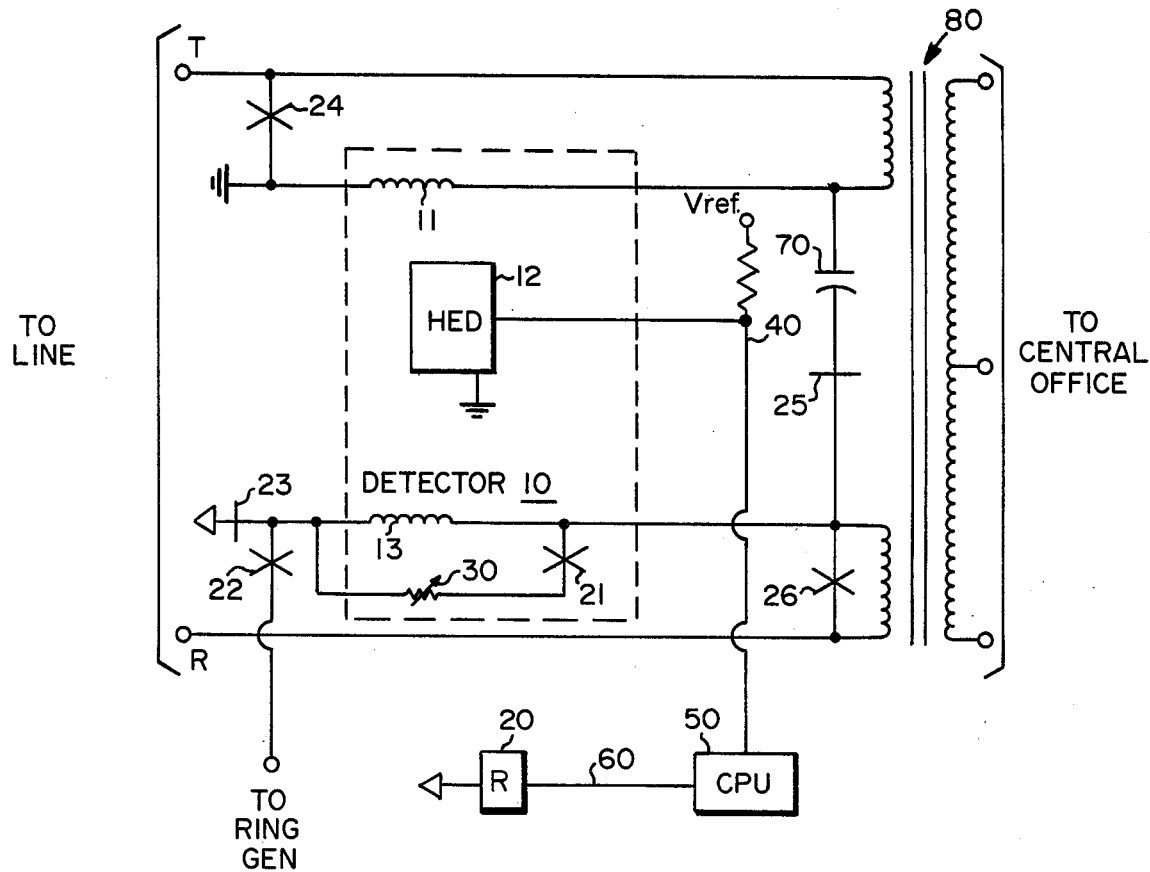

LOOP, DIAL PULSE AND RING TRIP DETECTION CIRCUIT

BACKGROUND OF THE INVENTION (1) Field of the Invention

The present invention relates to telephone subscriber line apparatus and more particularly to a circuit for determining the on-hook and off-hook status of a telephone subscriber loop.

(2) Description of the Prior Art

In order to provide connection of the switching network to a subscriber station, the central office must be able to detect when the subscriber lifts his handset to the off-hook position to initiate a call, or to answer a call when the central office rings his phone. Once the off-hook condition has been established the central office must also be able to detect the on-hook condition whether caused by placement of the handset in the on-hook position or a series of on-hook and off-hook dial pulses caused by operation of the dial or other calling device.

This problem has traditionally been solved by insertion of a relay in series in the loop which operates when the subscriber completes the loop by lifting his handset. A contemporary approach has been to use solid state devices such as optically-coupled transistors as disclosed in U.S. Pat. No. 3,829,619 issued Aug. 13, 1974, to S. W. Close, et al. Another recent solution has been to use operational amplifiers as disclosed in U.S. Pat. No. 3,941,939 issued Mar. 7, 1976, to P. L. Holmes, et al and U.S. Pat. No. 3,914,556 issued Oct. 21, 1975, to F. W. Frazee.

With further advances in technology, Hall effect devices are now employed in circuits for detection of loop current as disclosed in U.S. Pat. No. 4,020,294 issued Apr. 26, 1977, to R. Kitajewski, et al. In U.S. Pat. No. 4,022,980 also issued to R. Kitajewski, et al, on May 10, 1977, a Hall Effect Device was disclosed in a ring trip detection circuit.

These solutions to the loop dial pulse and ring trip detection problem have traditionally been accomplished through the use of two distinct circuits. Separation was required between the loop/dial pulse circuit and the ring trip circuit because of the differences in sensitivities required for determining loop status and ring trip.

A combination ring trip and dial pulse detection circuit was disclosed in U.S. Pat. No. 3,838,223 issued Sept. 24, 1974, to D. Q. Lee, et al. This circuit required the use of an optical-coupler, a plurality of logic gates, a delay circuit and a pole change circuit.

Accordingly, it is the object of this invention to provide a circuit which can detect both loop/dial pulse conditions and the minimum number of components, can operate without the need for separation of the two detection functions by overcoming the problem of different sensitivities for loop status detection and ring trip detection, and is adjustable for operation in a wide variety of loop circuit environments.

SUMMARY OF THE INVENTION

The present invention is a circuit which provides for loop, dial pulse and ring trip detection and is adjustable over a wide range of loop/dial pulse and ring trip sensitivities. This circuit is part of the line equipment of a telephone central office and monitors the loop/dial pulse and ring trip status of the telephone subscriber station apparatus.

This circuit consists of a pair of coils connected in series in the subscriber loop, with one coil inserted in the tip lead and the other in the ring lead. A Hall effect device is mounted in the magnetic field generated by these coils and provides electrical outputs corresponding to the presence or absence of magnetic flux. A variable resistor is mounted in parallel with the ring lead coil and is electrically connected in parallel with this coil when the central office operates the ringing relay to apply ringing current to the subscriber loop.

When the telephone subscribers hookswitch is operated, the subscriber loop is established to the Central Office and current flows from battery to ground through the loop and therefore through the two coils in the tip and ring leads of the loop. This current flow in the pair of coils produces a magnetic flux which is detected by a Hall effect device mounted proximal to the coils, which sends a corresponding electrical signal to the Central Processing Unit.

When both the subscribers hookswitch and the calling device are operated concurrently or when neither are operated, the subscriber loop is not established, so there is no current flow through the loop. Consequently, the two coils do not produce a magnetic flux and the Hall effect device generates a corresponding electrical signal.

If ringing current had been supplied to the loop, a ringing relay would have been operated by a Central Processing Unit at the Central Office and a variable resistor would have been connected in parallel with the ring lead coil. This shunt path would then allow the pair of coils and Hall effect device to produce an output indicating ring trip in response to operation of the subscribers hookswitch even though ringing current had been applied to the loop.

DESCRIPTION OF THE DRAWINGS

The single FIGURE of the accompanying drawing is a schematic diagram of a subscriber loop/dial pulse and ring trip detection circuit in accordance with the present invention.

DESCRIPTION OF THE PREFERRED EMBODIMENT

Referring now to the accompanying drawing, the subscriber loop/dial pulse and ring trip detection circuit 10 of the present invention is shown.

The detection circuit 10 is connected in the subscriber loop at the subscriber line apparatus in the central office, to monitor the subscriber line status. The tip lead of the subscriber loop is terminated with ground and the ring lead of the subscriber loop is terminated with battery. This circuit includes flux generator coil 11 connected in series in the tip lead, flux generator coil 13 connected in series in the ring lead, Hall effect device 12, connected to a source of reference voltage and to ground, and mounted in the magnetic field of flux generators 11 and 13 and an output connection to the Central Processing Unit 50. A variable resistor 30 is connected in series with make contact 21 of ringing relay 20, both of which are connected in parallel with flux generator 13.

The magnetic flux generating means is mechanically designed around a bobbin containing a pocket for rigid and precise positioning of the Hall effect device. This design also provides for adjustability of the magnetic flux density through positioning of the central core which functions as the metallic flux return path.

Normally the subscribers hookswitch is in the nonoperated position causing a lack of continuity in the subscriber loop and an absence of current flow from battery to ground through flux generator coils 11 and 13, and therefore coils 11 and 13 do not generate a magnetic flux. Hall effect device 12 responds to this absence of magnetic flow by producing a voltage level close to $V_{ref}$ which is detected by the Central Processing Unit 50 on lead 40.

When the subscriber operates his hookswitch, the loop is closed and current flows from battery to ground through flux generator coils 11 and 13, which produce a magnetic flux. Hall effect device 12 responds to this magnetic flux by generating a voltage level close to ground which is then detected by Central Processing Unit 50 on lead 40.

When the subscriber operates his calling device after operating his hookswitch to the "off-hook" position, the calling device breaks the loop circuit continuity resulting in an absence of current flow through coils 11 and 13. Consequently, there is an absence of magnetic flux generated by coils 11 and 13 and Hall effect device 12 responds to this absence of magnetic flux by generating a voltage level close to $V_{ref}$ which is then detected by Central Processing Unit 50 via lead 40.

This detection circuit 10 is operated in the ring trip mode when the Central Processing Unit 50 operates ringing relay 20, in any well known manner thereby connecting variable resistor 30 in parallel with flux generator 13 by means of make contact 21. This provides a shunt path for the ringing current from an associated ringing signal generator which was applied to the loop by make contact 22, and allows the flux generator to produce a magnetic flux in response to loop continuity caused by operation of the subscribers hookswitch. The variable resistor 30 allows for adjustment of ring trip sensitivity.

Ringing relay contact 26 is used to prevent ringing current from appearing on the secondary side of transformer 80 and relay contact 25 is used to prevent shorting of the ringing generator to ground.

The loop/dial pulse and ring trip detection circuit of the present invention monitors the status of the subscribers loop to detect operation of the subscribers hookswitch and dial pulse signaling when the subscriber originates a telephone call. This circuit also detects operation of the subscribers hookswitch to trip the ringing generator when the subscriber is the terminator of a telephone call.

It will be obvious to those skilled in the art that numerous modifications of the present invention can be made without departing from the spirit of the invention which shall be limited only by the scope of the claims appended hereto.

What is claimed is:

1. A telephone subscriber loop, dial pulse and ring trip detection circuit, for use in a telephone switching system, including a central processing unit, battery and ground sources, and a ringing relay connected to and periodically operated in response to said central processing unit, said ringing relay including a first pair of contacts, and said detection circuit connected to a plurality of subscriber substations by a plurality of subscriber loop circuits, said detection circuit, comprising:

magnetic flux generating means included in said subscriber loop operated in response to an absence of current flow from said battery to said ground in said subscriber loop to generate a magnetic flux of a first characteristic; said magnetic flux generating means further operated in response to said current flow from said battery to said ground in said subscriber loop to generate a magnetic flux of a second characteristic;

magnetic flux detection means connected in magnetic field proximity to said magnetic flux generating means operated in response to said magnetic flux of said first characteristic to generate a first output signal and said detection means further operated in response to said magnetic flux of said second characteristic to generate a second output signal; and shunting means connected in parallel with said magnetic flux generating means by said first pair of ringing relay contacts, said shunting means providing a low impendance path around said magnetic flux generating means.

2. A detection circuit as claimed in claim 1, wherein: said subscriber substation further includes a hookswitch, said magnetic flux generating means further operated to generate a magnetic flux of a second characteristic in response to a flow of current from said battery to said ground in said subscriber loop responsive to operation of said hookswitch, and said magnetic flux detection means operated to produce a second output in response to said magnetic flux of said second characteristic.

3. A detection circuit as claimed in claim 2, wherein: said subscriber substation further includes a calling device, said magnetic flux generating means further operated to generate a magnetic flux of said first characteristic in response to an absence of said current flow in said subscriber loop due to successive operation of said hookswitch and said calling device, and said magnetic flux detection means operated to produce a first output signal in response to said magnetic flux of said first characteristic.

4. A detection circuit as claimed in claim 2, wherein: said telephone switching system further includes a ringing generator and a second pair of ringing relay contacts, said ringing relay is operated to connect said ringing generator to said loop circuit via said second pair of ringing relay contacts and to connect said shunting means in parallel with said magnetic flux generating means via said first pair of ringing relay contacts; whereby said magnetic flux generating means is operated to generate an output of said second characteristic in response to the establishment of a continuous DC path over said subscriber loop caused by operation of said hookswitch, and said magnetic flux detection means is operated to produce a second output signal in response to said magnetic flux of said second characteristic.

5. A detection circuit as claimed in claim 1, wherein: said magnetic flux generating means comprise at least one coil connected in series in said subscriber loop.

6. A detection circuit as claimed in claim 1, wherein: said magnetic flux detection means comprise a Hall effect device.

7. A detection circuit as claimed in claim 1, wherein: said shunting means comprise a variable resistor.

* * * * *